United States Patent [19]
Henkel et al.

[11] 3,897,225
[45] July 29, 1975

[54] METHOD AND APPARATUS FOR GENERATING A GAS MIXTURE TO BE FORMED THROUGH CATALYTIC CONVERSION OF FUEL AND A GAS SERVING AS AN OXYGEN CARRIER

[75] Inventors: Hans-Joachim Henkel; Eugen Szabo DeBucs, both of Erlangen; Christian Koch, Nurnbert-Grossgrundlach, all of Germany

[73] Assignee: Siemens Aktiengesellschaft, Munich, Germany

[22] Filed: June 21, 1973

[21] Appl. No.: 372,422

[30] Foreign Application Priority Data
July 3, 1972 Germany............ 2232506

[52] U.S. Cl............ 48/107; 48/102 A; 48/196 R; 48/212; 23/288 K; 123/3; 123/119 E
[51] Int. Cl............ C01b 2/16
[58] Field of Search...... 48/107, 196 R, 212, 197 R, 48/93, 102 A, 180 R, 180 C, 180 B, 180 H, 102 R, 106; 23/288 R, 288 F, 288 K; 123/119 A, 119 E, 3; 261/114 R, 109

[56] References Cited
UNITED STATES PATENTS

| | | | |
|---|---|---|---|
| 1,722,339 | 7/1929 | Pauling | 23/288 |
| 2,201,965 | 5/1940 | Cook | 48/211 |
| 2,285,716 | 6/1942 | Hulsberg | 252/242 |
| 2,508,120 | 5/1950 | Lonngren | 196/52 |
| 3,248,453 | 4/1966 | Beyrard | 260/687 |
| 3,635,200 | 2/1970 | Rundell | 123/3 |
| 3,682,142 | 8/1972 | Newkirk | 123/3 |
| 3,798,005 | 3/1974 | Koch | 23/288 R |
| 3,810,732 | 5/1974 | Koch | 431/7 |

Primary Examiner—S. Leon Bashore
Assistant Examiner—Peter F. Kratz
Attorney, Agent, or Firm—Kenyon & Kenyon Reilly Carr & Chapin

[57] ABSTRACT

An improved gas reformer for generating a gas mixture through the catalytic conversion of a vaporized, gasified or atomized liquid fuel which has been mixed with an oxygen containing gas, in which a plurality of successive reaction stages are provided so that fuel not converted in a first reaction stage is converted in a further, succeeding reaction stage. The oxygen containing gas is mixed with the output of each reaction stage which is to be converted in a further reaction stage and the amount of oxygen in the oxygen containing gas in the mixture provided to each reaction stage is controlled in that reaction stage such that the amount of oxygen in the gas mixture is increased with decreasing temperature.

14 Claims, 2 Drawing Figures

METHOD AND APPARATUS FOR GENERATING A GAS MIXTURE TO BE FORMED THROUGH CATALYTIC CONVERSION OF FUEL AND A GAS SERVING AS AN OXYGEN CARRIER

BACKGROUND OF THE INVENTION

This invention relates to apparatus for reforming vaporized gasified or atomized hydrocarbons which are mixed with a gas serving as an oxygen carrier in a reforming device of the type having a mixing zone and an adjoining reaction zone in general, and more particularly to an improved manner of insuring complete conversion of the starting fuel.

Reformers of this type are used in particular for supplying fuel to internal combustion engines. Through their use, the fuel after being burned will emit a low level of pollutents. Apparatus of this nature is disclosed in U.S. patent applications, Ser. Nos. 218,696 now U.S. Pat. No. 3,828,736 and 270,923 and are designated therein as gas reformers. For the purposes of this specification, a gas reformer is defined as apparatus for generating a gaseous fuel by the chemical conversion of liquid fuel. A liquid fuel such as gasoline and containing hydrocarbons is varporized, gasified or atomized, mixed with an oxygen carrier gas and then conducted to a reaction zone for conversion into a gas mixture containing carbon monoxide, carbon dioxide and methane, and/or hydrogen which mixture is designated the reformed gas. The oxygen carrier gas is required for a soot free conversion. Generally, this gas will be comprised partially of exhaust gases fed back from the internal combustion engine and/or other gases which serve as oxygen carriers such as air. The mixture of the oxygen carrying gas and the vaporized hydrocarbon fuel is provided to a catalytic converter at a temperature which lies within the range of the starting temperature of the catalyst used and its temperature load limit. Within the catalytic converter the mixture is passed through a catalyst carrier containing the catalyst used in the conversion. After conversion into the reformed gas, additional gas serving as an oxygen carrier, such as air, is mixed to the reformed gas prior to it being fed to the combustion chambers of the internal combustion engine.

Thus, gas reformers of this nature in general will have a mixing zone which is joined to a reaction zone. The vaporized, gasified, or atomized hydrocarbon fuel is mixed in the mixing zone with an oxygen carrier. The mixture obtained therein is then fed into a reaction zone in which the conversion to a reformed gas takes place. In general the reaction zone will be a catalytic chamber and will preferably include catalyst carriers formed of highly porous sintered bodies having a large number of passage canals for the gas, the passage canals being arranged approximately parallel to each other. Through the use of carriers of this nature, the gas reformers can be minaturized to the extent that they are suitable for use in motor vehicles; the volume of a gas reformer is for example approximately 1,4 litre. As noted above, the use of these gas reformers permits an operation of the internal combustion engine which results in low levels of harmful emissions and thus helps to meet the current environmental standards. In addition, because the starting fuel can be gasoline, such as that currently available at most filling stations, this reduction in harmful emissions is obtained without a change in existing fuel supply facilities.

In gas reformers such as those described above, operating conditions can occur, for example, when the output is increased or the temperature is lowered under which a gas reformer which under normal operating condition provides adequate and, from a process management point of view practically complete conversion of the starting components will operate in a manner such that considerable quantities of unconverted starting fuel will be discharged from the reaction chamber of the gas reformer. One obvious manner of avoiding this problem is by enlarging the cross-sectional area of the gas reformer. However, such a solution suffers from a number of disadvantages. For example, the gas reformer would have unfavorable geometrical dimensions which would have a detrimental effect on the sintered blocks used. In particular, an appreciable increase in the size of the sintered blocks would bring about a reduction in their mechanical stability and furthermore an unfavorable ratio of surface volume would result. This latter effect would have a detrimental effect particularly in regard to heat radiation. Finally, such an increase in the size of the sintered blocks would also lead to a less favorable uniform flow of the starting components over the surface of the sintered blocks.

SUMMARY OF THE INVENTION

The present invention provides a method and apparatus for generating a gas mixture through catalytic conversion of vaporized, gasified or atomized liquid fuel (hereinafter, the use of any of these three words indicating liquid fuel which is in a state which allows it to be treated as a gas will be understood to include the other two) which is mixed with a gas serving as an oxygen carrier. In particular it provides such a method and apparatus which can be used in supplying internal combustion engines and which insures that under the operating conditions described above, i.e., an increased output and a reduction in temperature, trouble-free operation without the above noted disadvantages is obtained.

This operation is accomplished through providing a plurality of successive reaction stages so that any portion of the fuel not converted in a first reaction stage is converted in at least one further succeeding reaction stage, with gas serving as an oxygen carrier being mixed to the flow through the reactor ahead of each further reaction stage. Preferably the conversion of the fuel components not converted in the first reaction stage should be made as complete as possible. Certain residues of the starting fuel in the reformed gas produced however cannot be avoided as a practical matter. This percentage of unconverted starting fuel should normally not exceed the range of about 0.1 to 2%.

The method and apparatus of the present invention therefore prevent substantial quantities of unconverted fuel from exiting from the reaction chamber of the gas reformer under abnormal operating conditions. This is accomplished without increasing the cross-sectional area of the gas reformer and the disadvantages associated therewith. The present method and apparatus offers a further advantage in that unlike previously used methods in which the starting fuel and oxygen carrier gas are fed together to the gas reformer in the quantities required, the oxygen carrying gas, e.g., air and/or exhaust gas of an internal combustion engine, is fed in as a deficiency component in several stages in a dosed manner. This permits the reaction of the starting fuel with the oxygen carrying gas to be accomplished in several successive stages and avoids overheating of the front part of the reaction unit and results in a uniform temperature distribution over the entire catalyst bed. Because of this, a better adjustment of the reaction equilibrium is obtained and the danger of backfiring substantially reduced since the oxygen carrier gas is always fed in ahead of the corresponding reaction stage.

In one embodiment, in order to convert the starting fuel as completely as possible, two additional reaction stages are used after the first reaction or conversion stage. In addition, this permits keeping the flow losses low.

In the preferred embodiment the oxygen carrier gas is fed to the gas or gas mixture directly ahead of the reaction stages thereby almost completely reducing the danger of backfiring. Further the oxygen carrier gas is fed to the starting fuel ahead of the first reaction stage in the form of air and/or the exhaust gas of an internal combustion engine. Similarly, it is fed to the reformed gas mixture ahead of each of the other reaction stages in the form of air. The quantity and/or composition of the oxygen carrier gas to be mixed can advantageously be controlled as a function of the temperature of the respective reaction stages. This permits adjusting to different reaction conditions and operating conditions that conversion which takes place in the individual reaction or conversion stages.

Since it is advantageous to supply heat to the gas mixtures between the individual reaction stages in order to obtain a complete reaction therein, means are provided which permit using the heat of the exhaust gas of the internal combustion engine to heat up the gas mixture as it flows from stage to stage. In addition, after the last reaction stage means are provided to supply additional fuel to the reformed gas as desired. Such addition is particularly advantageous if the reformed gas contains a large amount of hydrogen which results in the calorific value of the combustionable gas mixture being lower than that needed. The addition of the fuel raises this calorific value. Such additions which may be up to about 50% of the starting fuel are particularly useful in meeting peak output demands of short duration. For example, demands caused during overtaking and passing of other vehicles. Although this results in an increased concentration of harmful substances in the exhaust gases, it is only of short duration because of the time limitations of such operations. In addition, such concentrations although above that normally obtained when operating with the reformed output are still far below those comparable levels obtained from conventional gasoline engines. The reformed gas obtained from the reaction will contain essentially carbon monoxide, carbon dioxide, hydrogen and/or methane and possible lower gaseous hydrocarbons particularly alkenes along with water and nitrogen.

The preferred apparatus for performing the method of the present invention essentially comprises a unit having a mixing chamber and a reaction chamber followed by at least one additional unit. Means are provided for gasifying the fuel where such gasifying can be done through vaporizing, spraying or atomizing, etc. In addition to the means for gasifying the fuel and providing it to the mixing chamber of the first unit, inlets are provided to admit an oxygen carrier gas to each of the mixing chambers. At the last reaction chamber, i.e., the reaction chamber of the last unit, an outlet for carrying away the reformed gas is provided. Additionally, there is shown a heat exchanger which may be used for preheating or vaporizing the starting fluid. The reformed gas leaving the last reaction chamber can be used as the heat source for this purpose. Note that by doing so the danger of obtaining a combustible mixture due to leaks in the heat exchanger is avoided. This is true since there is no air or other oxygen carrying gas mixed with either the reformed gas or the starting fuel. This danger does exist in the prior art methods in which the fuel and oxygen carrier gas are fed to the gas reformer in a mixed state and first pass through a heat exchanger in which case both the fuel and oxygen are simultaneously present.

DETAILED DESCRIPTION OF THE PREFERRED EMBODIMENT

Figure 1:
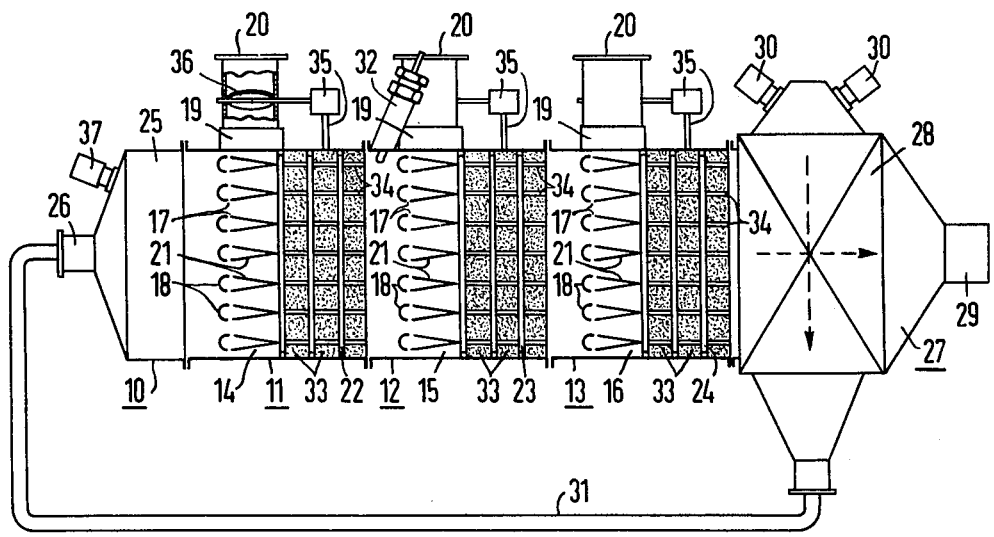
FIG. 1 is a schematic cross-section of a gas reformer according to the present invention.

In the embodiment of FIG. 1 a gas reformer having three units designated 11, 12 and 13 each of which comprise a mixing chamber and a reaction chamber are arranged in a common housing 10. The mixing chambers 14, 15 and 16 have installed therein a plurality of tubes 18 which are provided with discharge openings 17. Tubes 18 are arranged parallel to each other and feed a gas serving as an oxygen carrier to the mixing chambers 14, 15 and 16. The respective tubes of the chambers 14, 15 and 16 are connected to inlet chambers 19. The oxygen carrier gas is fed to the inlet chambers 19 via inlet pipes 20. The discharge openings 17 distribute the oxygen carrier gas evenly over the entire flow cross-section of the gas or gas mixture flowing through the mixing chambers. Adjoining the tubes 18 and discharge opening 17 are guide baffles 21 arranged so that the cross-sectional area of the flow is increased in the direction of the reaction chamber after being restricted by the tubes 18. Preferably the guide baffles are formed by the walls of the tube and are in the form of plane surfaces. For the manner of constructing such tubes and guide baffles see U.S. application entitled APPARATUS FOR REACTING VAPORIZED, GASIFIED OR ATOMIZED HYDROCARBON WITH A GAS SERVING AS AN OXYGEN CARRIER intended to be filed on even date herewith and assigned to the same assignee as the present invention. As disclosed therein, this arrangement of tubes results in uniform mixing of the components to be fed to the reaction chambers and in addition achieves a laminar flow with little turbulence thereby preventing backfire.

Fuel for the first unit 11 is provided through an opening 26 to a chamber 25. It then flows into the mixing chamber 14 where the fuel is mixed with the oxygen carrier gas from the discharge openings 17 of the tubes 18. As noted above this gas may be air and/or the exhaust gas of an internal combustion engine. The mixture is then fed to a reaction chamber 22. Here part of the fuel is converted into reformed gas. Upon leaving the reaction chamber 22 the mixture which now comprises partially fuel and partially reformed gas enters the mixing chamber 15 of the second unit 12. Here it is mixed with air from the discharge openings 17 of the tubes 18 therein and provided to the reaction chamber 23 where further quantities of the unconverted fuel are converted into reformed gas. The flow then enters the unit 13 where, in the mixing chamber 16, it has added to it further air from the discharge opening 17 of the tubes 18 therein after which it enters the reaction chamber 24. Here the residual fuel which has been mixed with the air is converted into reformed gas. After passing through the chamber 24 substantially all of the initial fuel has been converted to reformed gas. It is then passed through a chamber 27 which is designed at least in part as a heat exchanger 28. Within the heat exchanger 28 heat will be removed from the reformed gas. The cooled gas then leaves the chamber 27 via a line 29, and after addition of additional gas which serves as an oxygen carrier, and possibly after addition of further fuel as described above, is then fed to the combustion chambers of an internal combustion engine.

The liquid starting fuel is introduced into the heat exchanger 28 through one or several injection valves 30. The liquid fuel is evaporated within the heat exchanger 28 and fed over a line 31 to the opening 26 through which it enters the chamber 25 and the mixing chamber 14. An ignition device 32, for example a spark or glow plug, is provided in the mixing chamber 15 and is used for igniting the gas mixture. Similar ignition devices may also be provided in the mixing chamber 14 and 16. An ignition device provided in the mixing chamber 14 is arranged in the vicinity of the reaction chamber 22 so that it is located in a region where a combustible mixture is present. If the ignition device is placed in the mixing chamber 14 ahead of the discharge opening 17 of the tubes 18, provision is then made to introduce air through an opening during the starting phase, i.e., when the device is being started up additional air can be fed to the mixing chamber to form a combustible mixture. Such operation is described in the above-identified U.S. application filed on even date herewith.

The reaction chambers 22, 23 and 24 each comprise three catalytic carriers 33 provided with catalytic material preferably in the form of porous sinter blocks. The sintered blocks are preferably provided with a large number of passage canals which are arranged approximately parallel to each other in the direction of gas flow. Typically, the sintered blocks 33 will have a cross sectional area of about 80 mm by 80 mm and a thickness of about 15 mm. They are normally arranged within the reaction zone at a mutual spacing of about 4 mm. As an example of the type of sintered blocks which may be used are blocks made of a highly porous material, for example, of aluminum oxide and/or magnesium oxide or magnesium-aluminum silicate. Blocks of this nature should have a pore volume which is between 20 and 60%, preferably between 40 and 50%. The parallel passage canals which are perpendicular to the major surface of the sintered block will have a diameter for example, of 0.1 to 2 mm. From the passage canals the gas mixture will get into the catalytically active centers in the free pores of the sinter block to cause the required reaction will take place. The number of passage canals per square centimeter depends on the diameter of the passage canals. For example, with passages having a diameter of about 1 mm, 1 square centimeter of the sintered block will have about 40 passages.

Preferred catalysts for the conversion of fuel are nickel catalyst, a platinum catalyst or a nickel-platinum mixed catalyst. In general any catalyst which will convert the fuel into a reformed gas containing carbon monoxide, carbon dioxide, methane, and/or hydrogen may be used. Nickel sponge, for example can be used. This comprises nickel with a large active surface which does not sinter together at the temperature prevailing at the catalyst. By providing it with a gas which has carbon monoxide and methane and/or hydrogen in it, the internal combustion engine will be fed with a fuel which has a high octane number of over 100 and which will probably be in the range of 110. This permits the internal combustion engine to be operated using an antiknock fuel without the addition of harmful substances. In addition, the catalyst used for the conversion of fuel which may be nickel or platinum can be doped with uranium which will cause the preservation of the active centers in the catalyst. For a discussion of other suitable catalysts which may be used see United States Applications, Ser. Nos. 334,932 and 336,062.

Thermal sensors may be arranged in the reaction chambers 22, 23 and 24. These may for example be thermo couples and are attached to the respective sintered blocks and functionally connected with devices arranged in the lines 20 which feed the oxygen carrier gas to the respective mixing chamber. These devices in the inlet pipes 20 may comprise for example regulating valves or regulating vanes so that the proportion of oxygen carrier gas mixed with the fuel is controlled as a function of temperature. As an example there is shown on the figure a butterfly valve 36 in the inlet pipe 20 associated with the chamber 14 which is controlled by a control device 35 responsive to temperature sensing means in the reaction chamber 22. These are arranged so that with falling temperature in the reaction chamber more air is supplied to the corresponding mixing chamber or, if an air exhaust gas mixture is used as the oxygen carrier, that the percentage of air in the mixture is increased with falling temperature or that the percentage of exhaust gas is reduced. Preferably the temperature in the reaction chamber should be between about 150° and 900°C, the exact temperature being dependent upon the nature of the catalyst used. The temperature in the reaction chambers will preferably be between 600° and 800°C and more specifically, at about 750°C.

An example of the manner in which the method of the present invention may be carried out is as follows. Gaseous or vaporous fluid is introduced into the mixing chamber 14 and is mixed with air and exhaust gases of an internal combustion engine. Preferably one cubic meter of air and 0.5 cubic meters of exhaust gas are mixed in this chamber for each kilogram of fuel in the form of gasoline. The exhaust gas will contain essentially carbon dioxide, water and nitrogen in a volumetric ratio of about 1:1:6. When starting, only air is mixed with the fuel in the first mixing chamber with about 6 cubic meters of air being provided for each kilogram of fuel. During the starting phase fuel may be provided through an injection jet 37 since vaporization will not take place in the heat exchanger 28 until the reactor has reached an operating temperature. If and when sufficient heat is available in the heat exchanger, the fuel is then fed through the heat exchanger to chamber 25.

The mixture obtained in mixing chamber 14 is provided to the reaction stage 22. This stage operates at a temperature of about 730°C and will provide at its output a gas mixture which contains, in addition to unconverted gasoline a reformed gas consisting essentially of hydrogen, carbon monoxide, methane, water, carbon dixoide and nitrogen. To this mixture is added in the mixing chamber 15 0.4 cubic meters of air. This mixture is reacted in the reaction chamber 23 at a temperature of about 750°C and adds to the reformed gas already present further methane, carbon monoxide, hydrogen and some alkenes.

In the mixing chamber 16 an additional 0.4 cubic meters of air are added and this mixture then converted in the last reaction chamber 24 at a temperature of 770°C. Herein the remaining gasoline will be converted and provide additional methane, carbon monoxide, hydrogen and lower alkenes. The gas exiting chamber 24 will contain essentially no gasoline, all of it having been converted through the three stages. The final mixture will consist essentially of hydrogen, carbon monoxide, methane and alkenes, which provide the combustible components, along with carbon dioxide, water and nitrogen.

The device of the figures which can be used for carrying out this method can be made with outside dimensions of approximately 130 by 160 by 380 mm each of the units comprising a mixing chamber and reaction chamber will be approximately 110 mm long with the respective mixing and reaction chambers being about 55 mm long each. The volume of each of the mixing and reaction chambers is approximately 700 cubic centimeters.

In the practice of the present invention, the more air which is added to the fuel the higher the percentage of hydrogen which will be formed and the lower the corresponding calorific value. Thus it sometimes becomes advantageous to add fuel to the reformed gas, particularly if it has a high hydrogen content, before it is fed to the combustion chambers of an internal combustion engine. This permits increasing the calorific value of the mixture and in addition aids in cooling the reformed gas before it is fed to the internal combustion engine.

Suitable fuels for use in the present invention include among others aliphatic straight-chain hydrocarbons of short chain length, and therefore low octane number such as for example $C_7H_{16}$. The addition of anti knock agents such as lead and aromatic hydrocarbons which in the conventional operation of internal combustion engines cause harmful substances in the exhaust gas and pollute the atmosphere are not necessary. Instead, fuel low in harmful components and particularly gasoline low in such harmful substances may be used. In addition, operation with fuel which contains aromatic hydrocarbons is also possible since the latter will be decomposed within the reactor into harmless components. An internal combustion engine which is adjusted to operate with the reformed gas of the present invention which contains essentially carbon monoxide, methane and/or hydrogen as the combustible components will operate in a manner such as to emit substantially lower quantities of the environment polluting nitric oxides. The gas reformers of the present invention allow motor vehicles to obtain fuel from the existing network of filling stations. In addition, fuel low in harmful compounds and not having any anti knock agents may be used and thus costs in the refinery are reduced.

Figure 2:
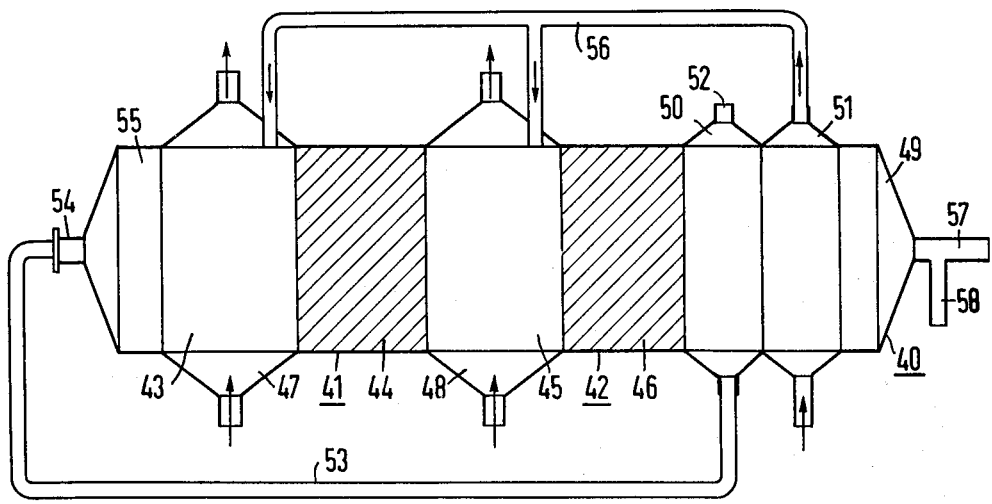
FIG. 2 is a similar view in more simplified form of a second embodiment of the gas reformer of the present invention.

In FIG. 2, a second embodiment of the invention is illustrated in simplified form. In this embodiment 40, two devices 41 and 42 comprised respectively of mixing chambers 45 and 47 and reaction chambers 44 and 46 are provided. At mixing chambers 43 and 45 respective heat exchangers 47 and 48 are provided. These heat exchangers serve to heat the mixtures flowing through the mixing chambers and may have heat supplied thereto from the exhaust gases of an internal combustion engine. At the last reaction chamber 46 a chamber 49 is placed which is equipped with two further heat exchangers 50 and 51. The heat exchanger 50 is used to vaporize the fuel used in the reactor. Fuel is introduced into the heat exchanger through an injection device 52 and leaves the heat exchanger via a line 53 from which it is led to an opening 54 and brought into a chamber 55 ahead of the first mixing chamber 43.

The second heat exchanger 51 at the chamber 49 is used to heat the incoming air which is supplied into the mixing chambers 43 and 45. Air enters the heat exchanger 51, is heated by the reformed gas and then provided over the line 56 to the mixing chambers 43 and 45. With this arrangement, the fuel first obtains heat from the reformed gas being also used to heat the air. The heat exchangers 50 and 51 can also be arranged reversely. The reformed gas exits the chamber 49 via a line 57 which is provided with a line 58 through which additional fuel can be mixed to the reformed gas. As described above the line 57 may then be connected to the combustion chambers of an internal combustion engine. Prior to entry into the combustion chambers of the engine, additional air or other oxygen carrier will be mixed therewith. The exhaust gases of the internal combustion engine after being passed through the heat exchangers 47 and 48 may be used at least in part as the oxygen carrier gas. In that case, they would be provided to the chamber 55. The exhaust gases can also be used in the preheating or vaporizing of the fuel in an additional heat exchanger replacing heat exchanger 50 of FIG. 2.

The method of the present invention and the apparatus disclosed in connection thereiwth can be used not only in internal combustion engines but also in gas turbines and the like. The method and apparatus are particularly well suited for use in motor vehicles, track bound surface vehicles and ships. In addition they may be used for supplying industrial and residential burners. Further, the reformed gas generated may be used as a reduction gas for example in metallurgical processes particularly in industrial burners.

Thus an improved method of producing reformed gases and apparatus for practicing the method has been shown. Although specific methods and specific embodiments of the apparatus have been shown and described, it will be obvious to those skilled in the art that various modifications may be made without departing from the spirit of the invention which is intended to be limited solely by the appended claims.

We claim:

1. A method for generating a reformed gas mixture which contains as combustible components essentially carbon monoxide, and at least one of the group consisting of hydrogen and methane from a mixture of vaporized liquid fuel and an oxygen carrier gas comprising the steps of:

a. converting the mixture in a first catalytic reaction stage into gas and unconverted fuel;

b. converting further amounts of the unconverted fuel from the output of said first reaction stage in at least one further reaction stage in series with said first stage to obtain reformed gas;

c. mixing an oxygen carrier gas with the output of each reaction stage which is to be converted in a further reaction stage, said mixing being accomplished after the output leave a stage but ahead of its entry into the further reaction stage;

d. controlling the amount of oxygen in the oxygen carrier gas in the mixture provided to each reaction stage as a function of the temperature in that reaction stage such that the amount of oxygen in the gas mixture is increased with decreasing temperature; and e. wherein the oxygen carrier gas mixed with the vaporized liquid fuel and converted in said first catalyst reaction stage consists of a mixture of the exhaust gas of an internal combustion engine and air with the percentages of air and exhaust gas varying between 0 and 100% and wherein the oxygen carrier gas admixed ahead of each further reaction stage is air.

2. The method according to claim 1 wherein the non-reacted fuel in said first stage reaction output is converted in a second reaction stage in series with said first stage and the non-reacted fuel in said second reaction stage output converted in a third reaction stage in series with said first and second stages.

3. The method according to claim 1 wherein the oxygen carrier gas is mixed with said outputs immediately ahead of their entry into a further reaction stage.

4. The method according to claim 1 and further including the step of adding additional fuel to the output of the last reaction stage.

5. The method according to claim 1 and further including the step of supplying heat to the respective mixtures entering each reaction stage.

6. Apparatus for catalytically converting a mixture of a vaporized liquid fuel and an oxygen carrier gas into a reformed gas which contains as combustible components essentially carbon monoxide, and at least one of the group consisting of hydrogen and methane comprising:

a. first means comprising:
  1. a first mixing chamber; and
  2. a first catalytic reaction chamber coupled thereto and in flow communication therewith;

b. at least one further means comprising:
  1. a further mixing chamber; and
  2. a further catalytic reaction chamber;

c. the mixing chamber of each further means coupled to the output of the catalytic reaction chamber of a previous means and in flow communication therewith;

d. means for vaporizing the liquid fuel;

e. means to provide the vaporized fuel to said first mixing chamber;

f. first means for providing a mixture of the exhaust gas of an internal combustion engine and air with the percentages of air and exhaust gas varying between 0 and 100% to said first mixing chamber and second means for providing air to said further mixing chamber;

g. means defining an outlet coupled to the output of the furthest reaction chambers and in flow communication therewith;

h. thermal sensing means installed in each of said reaction chambers; and i. means responsive to said thermal sensing means to control the supply of the mixture of exhaust gas and air respectively to each of said mixing chambers such that the amount supplied is increased with decreasing temperatures.

7. The invention according to claim 6 and further including a heat exchanger through which the fuel passes before entering the first mixing chamber.

8. The invention according to claim 6 and further including an ignition device in one of said first and further mixing chambers.

9. The invention according to claim 6 wherein each of said mixing chambers contains therein a plurality of tubes having discharge openings distributed over the cross-section of the flow through the chamber.

10. The invention according to claim 6 and further including means to add additional liquid fuel to the output of the last of said further units.

11. The invention according to claim 6 wherein each reaction chamber comprises at least one catalytic carrier provided with a catalyst.

12. The invention according to claim 11 wherein said catalytic carriers comprise porous sintered blocks having a large plurality of essentially parallel passage canals formed therein.

13. The invention according to claim 6 and further including means to heat the mixture of air and exhaust gas and air respectively entering said first and further mixing chambers.

14. Apparatus for catalytically converting a mixture of a vaporized liquid fuel and an oxygen carrier gas into a reformed gas which contains as combustible components essentially carbon monoxide, and at least one of the group consisting of hydrogen and methane comprising:

a. first means comprising:
  1. a first mixing chamber containing a plurality of tubes having discharge openings distributed over the cross-section of the flow through chamber and including guide baffles extending from said discharge openings in the direction of flow to the vicinity of an associated reaction chamber; and
  2. a first catalytic reaction chamber coupled thereto and in flow communication therewith;

b. at least one further means comprising:
  1. a further mixing chamber, containing a plurality of tubes having discharge openings distributed over the cross-section of the flow through the chamber and including guide baffles extending from said discharge openings in the direction of flow to the vicinity of an associated reaction chamber; and
  2. a further catalytic reaction chamber;

c. the mixing chamber of each further means coupled to the output of the catalytic reaction chamber of a previous means and in flow communication therewith;

d. means for vaporizing the liquid fuel;

e. means to provide the vaporized fuel to said first mixing chamber;

f. first means for providing a mixture of the exhaust gas of an internal combustion engine and air with the percentages of air and exhaust gas varying between 0 and 100% to the tubes in said first mixing chamber and similarly for providing air to the tubes in said further mixing chamber;

g. means defining an outlet coupled to the output of the furthest reaction chamber and in flow communication therewith;

h. thermal sensing means installed in each of said reaction chambers; and i. means responsive to said thermal sensing means to control the supply of the mixture of air and exhaust gas and air respectively to each of said mixing chambers such that the amount supplied is increased with decreasing temperatures.

* * * * *

UNITED STATES PATENT AND TRADEMARK OFFICE
CERTIFICATE OF CORRECTION

PATENT NO. : 3 897 225
DATED : July 29, 1975
INVENTOR(S) : HANS-JOACHIM HENKEL ET AL It is certified that error appears in the above-identified patent and that said Letters Patent are hereby corrected as shown below:

In column 9, line 8, change "output leave a" to --output leaves a--

In column 10, line 4, change "of the mixture of exhaust gas and air respectively" to --of the mixture of air and exhaust gas and air respectively--

Signed and Sealed this ninth Day of December 1975

[SEAL]

Attest:

RUTH C. MASON
Attesting Officer

C. MARSHALL DANN
Commissioner of Patents and Trademarks